United States Patent
Asbrand

(10) Patent No.: US 9,533,456 B2
(45) Date of Patent: Jan. 3, 2017

(54) BLOW-MOULDING MACHINE WITH AUTOMATIC OPTIMIZATION OF THE PROCESS ANGLE

(71) Applicant: KRONES AG, Neutraubling (DE)

(72) Inventor: Helmut Asbrand, Bad Abbach (DE)

(73) Assignee: KRONES AG, Neutraubling (DE)

( * ) Notice: Subject to any disclaimer, the term of this patent is extended or adjusted under 35 U.S.C. 154(b) by 960 days.

(21) Appl. No.: 13/670,672

(22) Filed: Nov. 7, 2012

(65) Prior Publication Data
US 2013/0113144 A1   May 9, 2013

(30) Foreign Application Priority Data
Nov. 8, 2011   (DE) .................. 10 2011 055 153

(51) Int. Cl.
- B29C 49/78  (2006.01)
- B29D 22/00  (2006.01)
- B29C 49/12  (2006.01)
- B29C 49/36  (2006.01)

(52) U.S. Cl.
CPC ............ B29D 22/003 (2013.01); B29C 49/783 (2013.01); *B29C 49/12* (2013.01); *B29C 49/36* (2013.01); *B29C 2949/78025* (2013.01); *B29C 2949/78042* (2013.01); *B29C 2949/78537* (2013.01); *B29C 2949/78554* (2013.01)

(58) Field of Classification Search
CPC ............. B29C 49/783; B29C 49/78; B29C 2949/78554; B29C 2949/78537; B29C 2949/78521
USPC ................................. 264/523, 526
See application file for complete search history.

(56) References Cited

U.S. PATENT DOCUMENTS

| | | | |
|---|---|---|---|
| 3,873,661 A * | 3/1975 | Kontz ..................... | B29C 49/48 264/102 |
| 8,535,037 B2 | 9/2013 | Voth | |
| 2004/0173949 A1* | 9/2004 | Storione ................ | B29C 49/18 264/529 |
| 2006/0012085 A1* | 1/2006 | De Bruyn ............. | B29C 49/783 264/529 |
| 2006/0099340 A1 | 5/2006 | Behle et al. | |

FOREIGN PATENT DOCUMENTS

| | | | |
|---|---|---|---|
| DE | 10116665 A1 * | 10/2002 | ............ B29C 49/64 |
| GB | 2 431 372 | 4/2007 | |
| WO | 2007077241 | 7/2007 | |
| WO | 2008/122311 | 10/2008 | |

* cited by examiner

Primary Examiner — Christina Johnson
Assistant Examiner — Xue Liu
(74) Attorney, Agent, or Firm — Greer, Burns & Crain, Ltd.

(57) ABSTRACT

A method of shaping plastics material pre-forms into plastics material containers with the steps:
  introducing a plastics material pre-form into a blow mold;
  conveying the blow mold with the plastics material pre-form along a pre-set conveying path;
  acting upon the plastics material pre-form with a gaseous medium during a pre-set period of time for the expansion thereof, wherein the supply of the gaseous medium is carried out in a controlled manner; and
  releasing the container from pressure at a pre-set point in time.

According to the invention the pre-set point in time (t2) is variable.

13 Claims, 2 Drawing Sheets

BLOW-MOULDING MACHINE WITH AUTOMATIC OPTIMIZATION OF THE PROCESS ANGLE

BACKGROUND

The present invention relates to a method and an apparatus for the shaping of plastics material pre-forms into plastics material containers. Machines of this type, referred to below as blow-moulding machines, have long been known from the prior art. It is usual in this case for plastics material pre-forms to be transferred to a blow-moulding station and for this blow-moulding station to be arranged on a movable carrier, for example a rotatable blow-moulding wheel. During the conveying of the plastics material pre-form situated inside the blow-moulding station it is blown or expanded by being acted upon with compressed air in order to form a plastics material container. For this purpose the plastics material pre-form is acted upon at very high pressure, for example over 40 bar.

It is also known from the prior art for blow moulds of this type or the carriers thereof to be locked with one another during the expansion process. After the actual expansion, the pressure inside the container is reduced again and the container is released. In this case, it should be noted that at a specific point on the blow-moulding station along its conveying path, it has to be released again so that it can be opened again without damage.

In this case, it is usual in the prior art for the release of the container to be initiated at a process angle or at a pre-set process time, so that the container is completely released in every case at the aforesaid point in time, so that the blow-moulding station can be opened in this way without risk. Accordingly, the starting time at which the release of the plastics material pre-form is started is set relatively early in order to ensure that the pressure is released sufficiently at the aforesaid point in time.

In many cases, however, this leads to a waste of process time, since it would frequently be desirable to maintain this process time or the pressure inside the containers as long as possible.

SUMMARY

The object of the present invention is therefore to improve methods of shaping plastics material pre-forms into plastics material containers and corresponding blow-moulding machines in such a way that better use can be made of the available process time.

In the case of a method according to the invention for the shaping of plastics material pre-forms into plastics material containers, a plastics material pre-form is introduced into a blow mould and, after that, the blow mould is conveyed with the plastics material pre-form along a pre-set conveying path. In particular, during this conveying the plastics material pre-form is acted upon with a gaseous medium for a pre-set period of time for the expansion thereof, in which case the supply of the gaseous medium is carried out in a controlled manner.

In addition, the container is released from pressure at a pre-set point in time t2 which in particular is after the pre-set period of time or terminates the latter. According to the invention the pre-set point in time t2, at which the container is released from pressure, is variable.

The point in time t2 is understood below to be that point in time at which the pressure release of the container is initiated. It would also be possible, however, for another definition of the aforesaid point in time to be taken as a basis, for example a pre-set period of time after the opening of a corresponding release valve.

On account of the variability of a pre-set point in time, it is possible for the process time to be prolonged in particular individually for each blow-moulding station to the maximum degree and to be adapted in each case.

It is advantageous for the containers to be conveyed along a circular path, in which case for example a plurality of blow-moulding stations can be arranged on a blow-moulding wheel.

For this reason, a specified process angle or—if the conveying is not to take place along a circular path—also a specified track portion can thus be associated with the point in time t2 (and also with other points in time characteristic of the method) in particular individually for each blow-moulding station. In this way, the point in time is advantageously understood to be a point in time which is associated with a specified blow-moulding station or a specified plastics material pre-form.

The point in time at which the release is initiated is preferably set in such a way that the mould is completely released at a further point in time. It is usual for the point in time and also the process angle, when the blow-moulding station has to be without pressure or virtually without pressure, to be fixed during the construction or building of an apparatus for the shaping of plastics material pre-forms into plastics material containers. This point in time is fixed or set.

In the case of a further advantageous method, a plurality of plastics material pre-forms and a plurality of blow-moulding stations are conveyed, and it is advantageous for the respective point in time t2 at which the release is started to be variable for these blow-moulding stations.

In the case of a further advantageous method, the plastics material pre-forms are introduced into an opened blow mould, and, after that, the blow-moulding station is closed and, in a particularly preferred manner, is also locked. During these method steps, the individual blow-moulding stations are advantageously moved and, in a particularly preferred manner, are moved continuously. After the expansion of the plastics material pre-form into the plastics material container, the locking is advantageously released and, after that, the blow mould is opened again, in order to be able to remove the now finished plastics material container. The aforesaid point in time thus relates to the conveying of the plastics material pre-forms, so that as mentioned above, it is alternatively also possible to speak of a pre-set process angle. It is preferable for the method to be a so-called stretch blow-moulding method, i.e. the plastics material pre-forms are not only expanded by being acted upon with a gaseous medium but are also extended in their longitudinal direction (in particular by means of a stretch bar).

In the case of a further advantageous method, a signal is sent to a release valve at the pre-set point in time t2, as a result of which the pressure release procedure is initiated. It is advantageous for the signal to be sent by a control device to the aforesaid release valve.

In the case of a further advantageous method, a fixing of the point in time at which the pressure release takes place or is initiated takes place in a manner dependent upon a second subsequent point in time at which the blow mould is released from pressure or has to be released from pressure. This specified point in time can be formulated accordingly as a process angle (difference).

In the case of a further advantageous method, a pressure of the gaseous medium is determined inside the container. It is advantageous for the pressure of the gaseous medium inside the container to be determined continuously—at least continuously during the expansion process and/or the subsequent release process of the container.

In this case it is possible for a pressure measuring instrument to be introduced into the container, but it is preferable for the internal pressure of the container to be determined outside the container.

In the case of a further advantageous method, a point in time t3 is determined at which an internal pressure of the container drops below a pre-set pressure threshold. After the beginning of the release, the pressure inside the container will drop. The pressure threshold can be considered to be for example a pressure value of 0.5 bar, i.e. a pressure as from which the blow mould can now be opened and which can be regarded as released from pressure. It is advantageous for this pressure threshold to be between 0.2 bar and 4 bar, preferably between 0.2 bar and 2 bar, and in a particularly preferred manner between 0.3 bar and 1 bar. This pressure is preferably a pressure with respect to atmospheric pressure.

It is thus advantageous for this aforesaid threshold value also to be characteristic of the point in time at which the blow mould is released from pressure. It is thus advantageous for the time to be measured between the point in time at which the pressure release is begun and the point in time at which the internal pressure of the container has dropped below the threshold value. The point in time at which the pressure release is begun can be equated for example with the point in time at which an electrical signal was sent to the release valve which causes the release valve to open. It is advantageous for a time difference to be determined between the two aforesaid points in time, i.e. the point in time at which the pressure threshold is not reached and the point in time at which the release valve was opened.

It is advantageous for a plurality of blow moulds or blow-moulding stations of this type to be provided, into which the plastics material pre-forms are introduced in each case, the time differences between the respective points in time t3 and t2 being determined in each case. It is advantageous for the individual blow-moulding stations to be arranged on the same movable carrier in each case.

Instead of and/or in addition to the time differences it is also possible, however, for differences in the process angle to be determined. In the case of a further advantageous method the individual measured time differences for each individual blow-moulding station are compared with one another and the greatest time difference of these time differences is determined. It is advantageous for the point in time t2 (preferably common to all the blow-moulding stations)—or the process angle associated with it—now to be determined on the basis of this greatest time difference. In this way, the time between the electrical signal to the release valve and the point at which the pressure in the bottle is lower than the threshold value mentioned above is advantageously measured for each individual blow-moulding station, and, after that, the greatest time difference or the greatest angle is determined in order to determine the release time or the release angle. In this case this greater angle can be counted back by means of the maximum angle (or the maximum time) and can then be made equal for all the blow-moulding stations.

In this way, the process angle at which the release of the containers is begun can be optimized for all the blow-moulding stations. It would also be possible, however, for the aforesaid optimization to be carried out individually for each individual blow-moulding station and can therefore also be different for the individual blow-moulding stations.

In the case of a further preferred method the pre-set point in time (t2) is variable in a manner dependent upon a process angle and/or a portion of the stretch of the conveying path. In this way, that process time in which the plastics material pre-form is acted upon with pressure can be extended in an optimum manner. It is thus also preferable in this case for an adaptation or change of this point in time to take place in a manner dependent upon a variable relevant to a location such as for example the process angle and/or the portion of the stretch of the conveying path, for example a process angle and/or a portion of the stretch on which the corresponding plastics material pre-form is present.

The present invention further relates to an apparatus for the shaping of plastics material pre-forms into plastics material containers. This apparatus has a conveying device on which a plurality of blow-moulding stations for shaping the plastics material pre-forms into the plastics material containers are arranged. In this case, the conveying device conveys the blow-moulding stations along a pre-set conveying path. The blow-moulding stations have in each case blow moulds inside which the plastics material pre-forms are shaped into the plastics material containers and, in addition, the blow-moulding stations have in each case stressing devices which act upon the plastics material pre-forms with a gaseous medium for their expansion. In addition, the apparatus has a control device which controls the stressing of the individual plastics material pre-forms with the gaseous medium and each blow-moulding station has at least one release valve which controls (in particular, permits or prevents) the escape of the gaseous medium out of the plastics material containers.

In this case, the control device for each blow-moulding station initiates the escape of the gaseous medium at a pre-set point in time. According to the invention, the pre-set point in time is variable.

It would also be possible, however, for a plurality of control devices to be provided which in each case initiate the release of the plastics material container for the individual blow-moulding stations. In this case it is advantageous for a specified point in time for the release to be associated in each case with the blow-moulding stations. It would also be possible, however, for a specified process angle to be determined at which the release process is initiated in each case or the release valve is opened respectively.

In the case of an advantageous embodiment, the apparatus has a pressure detection device for detecting an internal pressure in the containers or a measurement value characteristic thereof. It is advantageous for the pressure detection device to detect the internal pressure continuously or at least continuously in a pre-set period of time. The control device is advantageously designed in such a way that it sets when the aforesaid pressure threshold is achieved or is not reached. It is advantageous for each individual treatment station to have a pressure detection device of this type. In the case of a further advantageous embodiment, the control device is designed in such a way that it calculates individually the times specified above and, in a particularly preferred manner, the control device controls the plant in a manner dependent upon a specified time value or difference value.

As mentioned above, it is advantageous for the pre-set point in time (t2) to be variable in a manner dependent upon a process angle and/or a portion of the stretch of the conveying path. Hereby the actual process time in which the pre-form is acted upon with pressure can be prolonged or adapted in an optimal manner.

BRIEF DESCRIPTION OF THE DRAWINGS

Further advantages and embodiments are evident from the accompanying drawings. In the drawings

DETAILED DESCRIPTION

Figure 1:
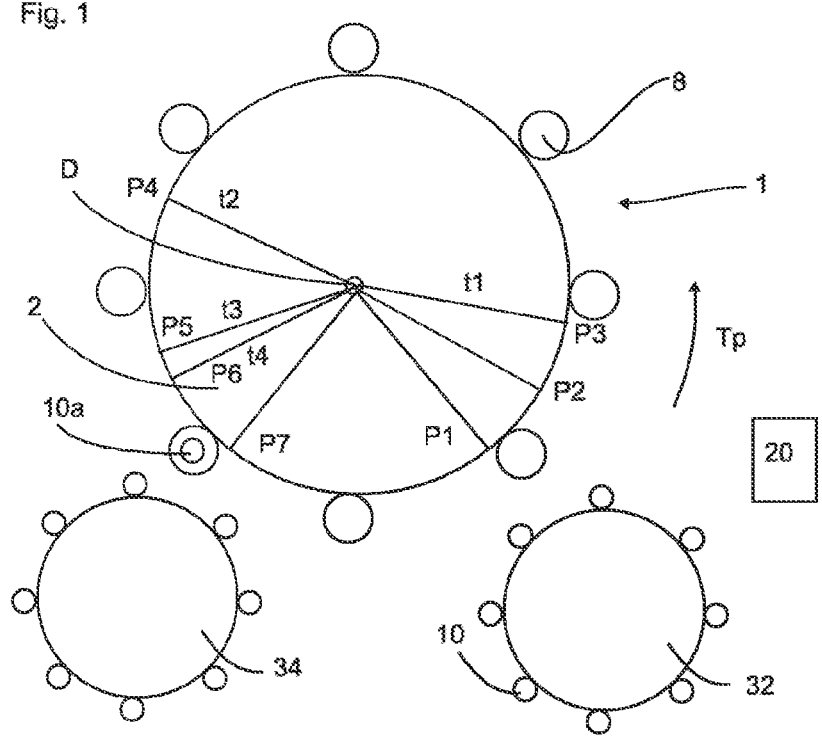
FIG. 1 is a diagrammatic illustration of an apparatus according to the invention.

FIG. 1 is a diagrammatic illustration of an apparatus 1 according to the invention for the shaping of plastics material pre-forms into plastics material containers. This apparatus 1 has a supply device such as a conveying star wheel 32, which supplies plastics material pre-forms 10 to the apparatus 1. In addition, a heating device for heating the plastics material pre-forms can also be provided upstream of the apparatus 1 in the conveying direction of the plastics material pre-forms. The apparatus 1 has a carrier 2 which is rotatable about an axis of rotation D and on which a plurality of blow-moulding stations 8 are arranged. The plastics material preforms 10 are shaped in each case into plastics material containers 10a by means of these blow-moulding stations 8. The plastics material containers produced in this way are removed by means of a removal wheel 34.

The reference P1 designates a transfer point at which the plastics material pre-forms are transferred to the apparatus 1 or a blow-moulding station 8 respectively. This transfer point P1 is thus set clearly by the arrangement of the plant 1 as a whole. The reference P7 relates to a transfer point at which the blown container is transferred to the removal device 34. This transfer point is also set. Points in time (in particular individual points in time for the individual blow-moulding stations) can also be associated with the individual points P1 to P7. The blow mould is closed and also optionally locked as from a point P2 and the blowing of the containers is started as from a point P3.

In this case, the plastics material pre-forms 10 are advantageously acted upon at different pressure levels, such as for example a preliminary blowing pressure and a finished blowing pressure. It is advantageous for the apparatus according to the invention also to have a plurality of valves in order to control the pressure, in particular at the different pressure stages specified. A control device 20 is used for controlling the individual pressure stages.

In addition, the plastics material pre-forms 10 can be stretched at the same time along their longitudinal direction by means of a stretch bar. At a point P4 or at a point in time t2 associated with this point P4 the individual containers are released again or the corresponding release valve is opened respectively. For the production of the containers it is desirable for this point in time t2 to be set as late as possible, so that if possible a large amount of process time can be utilized for cooling or tempering the plastics material containers 10a. At the point in time t2, a release valve is therefore actuated by means of a control device 20 (cf. FIG. 1) in order to initiate the release of the container 10a.

As from the point P6, which is likewise preferably set by the arrangement of the plant, the blow-moulding station is unlocked and opened in order to be able to remove the finished container. The point in time t4 accordingly designates the point in time at which these procedures are initiated (for example by a control cam).

The point in time t3 designates a point in time and P5 the point at which an internal pressure in the container has dropped below a pre-set threshold value. Below this threshold value it is possible to open the blow mould. In FIG. 1 the point in time t3 is before the point in time t4, in particular if a specified safety period of time is taken into consideration before the blow mould is opened.

The individual points P1 to P7 can therefore have associated with them specified process angles, in which case for example the angle 0° can be associated with the point P1. The reference Tp designates the conveying path (in this case circular) on which the containers 10, 10a are conveyed during their expansion.

Figure 2:
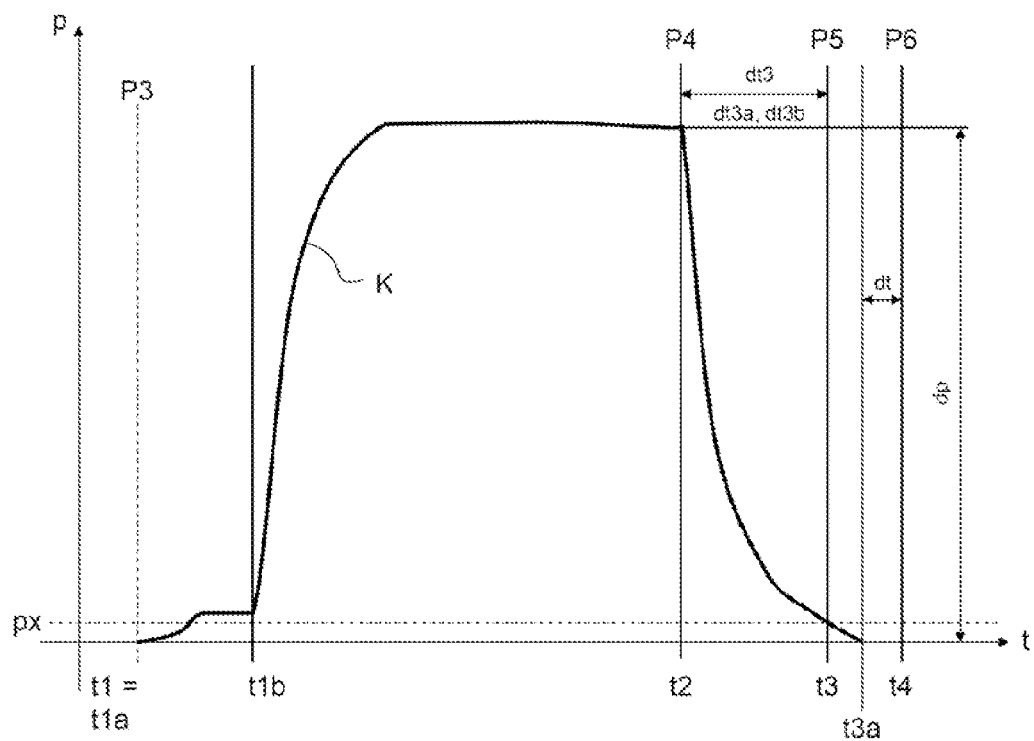
FIG. 2 is an illustration of a pressure pattern in order to explain the invention.

FIG. 2 shows a pattern of a pressure curve K inside a container to be expanded. It will be seen that at the point in time t1 or the point P3 respectively the blowing of the plastics material pre-form has begun. The plastics material pre-form is first acted upon with a preliminary blowing pressure until the point in time t1a, this preliminary blowing pressure is then maintained until the point in time t1b, and the container is then acted upon with the finished blowing pressure after this point in time t1b. This finished blowing pressure is essentially maintained for a pre-set period of time. The reference dp designates the pressure level at the beginning of the release.

At the point P4 or the point in time t2 corresponding thereto respectively, the expansion valve is opened and the air can escape out of the now finished blown plastics material container. The point in time t2 thus represents the point in time of the beginning of a prolonged or permanent release during the period of time dt3. At the point in time t3 or t3a respectively the container is released from pressure and the pressure inside the container is below the threshold value px mentioned above.

The reference P6 designates that point at which the pressure release has to be closed off at the latest in order to be able to open the blow-moulding station safely. The reference dt thus designates that period of time which can be gained by the method according to the invention for the process time. The point in time t4 is fixed and the point in time t3 is determined by pressure measurement. In addition, the point in time t2, at which the release valve was opened, is known.

The period of time dt3a, dt3b . . . (the indices a, b . . . stand for the individual blow-moulding stations), which lasts between the opening of the release valve on the one hand and the drop in the pressure below the threshold valve named above on the other hand, can therefore be calculated for each individual blow-moulding station. In addition, the maximum dt3max of these individual determined periods of time dt3a, dt3b . . . can be determined and this maximum time value dt3max can be counted back starting from the point in time t4 at which the container has to be released in any case, in order to determine the point in time t2 which is the same for all the blow-moulding stations. This means, however, that better use can be made of the process time than in the prior art, at least for the remaining blow-moulding stations (for which the period of time does not assume the maximum value mentioned above). In this way, an automatic optimization of the process angles is possible.

Figure 3:
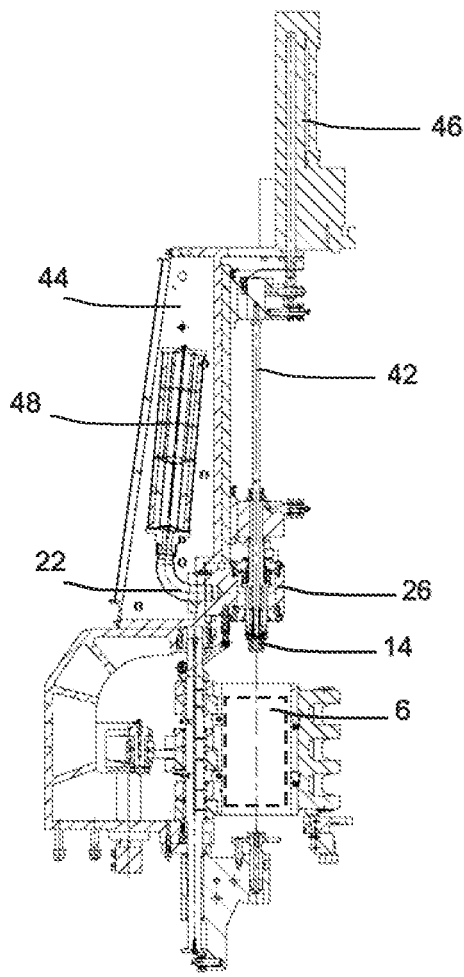
FIG. 3 is an illustration of a blow-moulding station.

FIG. 3 is a diagrammatic illustration of a blow-moulding station 8. This blow-moulding station has in this case a blow mould 6 which is arranged in a removable manner and which is shown only in broken lines in this case since it is held by blow-mould carriers and is thus not directly visible. The reference number 14 relates to a stressing device such as a blow-moulding nozzle, which acts upon the plastics material pre-forms with blowing air. A drive device 46 for moving a stretch bar 42 is arranged on a carrier 44. The reference number 26 relates in its entirety to a valve block. A plurality of valves, which control the stressing of the plastics material pre-forms with the individual pressure levels, are advantageously arranged inside this valve block. The reference number 48 designates a silencer which can be arranged inside the carrier 44.

Figure 4A:
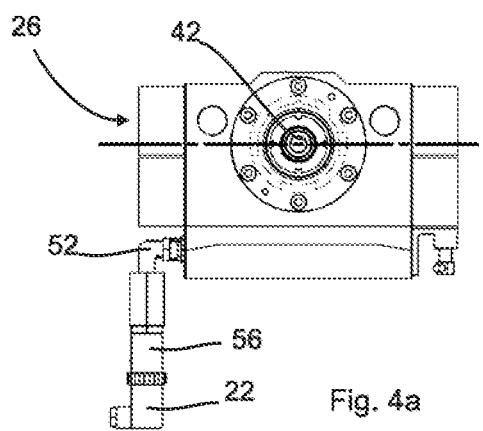
FIGS. 4a, b are two illustrations of a valve block.
Figure 4B:
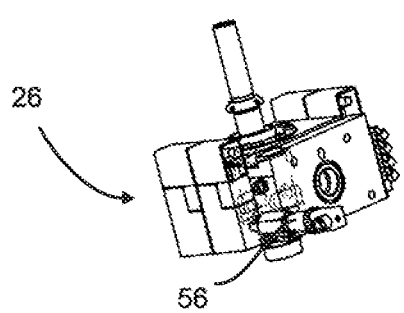

FIGS. 4*a, b* are two illustrations of a valve block. In this case the reference number 52 relates to a removal line, by way of which the blowing air can be released out of the container. The reference number 56 designates a pressure measurement instrument and the reference number 22 the release valve.

The Applicants reserve the right to claim all the features disclosed in the application documents as being essential to the invention, insofar as they are novel either individually or in combination as compared with the prior art.

LIST OF REFERENCES

1 apparatus
2 conveying device
6 blow mould
8 blow-moulding station
10 plastics material pre-form
10*a* plastics material containers
14 stressing device, blow-moulding nozzle
20 control device
22 release valve
26 valve block
32 supply device
34 removal device
42 stretch bar
44 carrier
46 drive
48 silencer
52 removal line
56 pressure measurement instrument
K curve
P1 transfer point of the plastics material preforms 10 to the apparatus 1
P2 point as from which the blow mould is closed
P3 (t1) point (point in time) as from which the blow-moulding procedure is started
P4 (t2) point (point in time) as from which the release is initiated
P5 (t3) point (point in time) at which the internal pressure has dropped below the threshold value
P6 (t4) point (point in time) of the opening and unlocking of the blow moulding
P7 transfer point of the plastics material containers 10*a* on the removal device
dt3 period of time of the pressure release
dt3*a*, dt3*b* . . . period of time of the pressure release for the individual blow-moulding stations
dt3*max* maximum of the individual periods of time dt3*a*, dt3*b* . . . .
dt period of time capable of being gained for the process
Tp conveying path of the plastics material containers
t1*a*, t1*b* points in time
D axis of rotation
dp pressure level at the beginning of the release
px threshold pressure level below which unlocking can take place

The invention claimed is:

1. A method of shaping plastics material pre-forms into plastics material containers, comprising:
   introducing a plastics material pre-form into a blow mould;
   conveying the blow mould with the plastics material pre-form along a pre-set conveying path;
   acting upon the plastics material pre-form with a gaseous medium for a pre-set period of time for expansion thereof, wherein a supply of the gaseous medium is carried out in a controlled manner;
   releasing a container from pressure at a pre-set point in time t2, wherein t2 is a point in time at which the pressure release of the container is initiated; and
   associating a specified process angle of the conveying path with the pre-set point in time t2,
   wherein the pre-set point in time t2 is variable.

2. The method according to claim 1, wherein a signal is sent to a release valve at the pre-set point in time t2, as a result of which the pressure release procedure is initiated.

3. The method according to claim 1, wherein a fixing of the point in time t2 takes place at which the pressure release takes place in a manner dependent upon a second subsequent point in time t3 at which the blow mould is released from pressure completely or is released at least below the threshold pressure level px, at which unlocking of the mould carrier is possible without difficulty.

4. The method according to claim 1, wherein a pressure of the gaseous medium is determined inside the container.

5. The method according to claim 4, wherein a point in time is determined at which a pressure inside the container drops below a pre-set pressure threshold.

6. The method according to claim 5, wherein a time difference dt3*a* is determined between the point in time t3 and the point in time t2.

7. The method according to claim 6, wherein a plurality of blow moulds are provided, into which the plastics material pre-forms are introduced in each case and the time differences dt3*a*, dt3*b* . . . between the respective moments in time t3 and t2 are determined.

8. The method according to claim 7, wherein the time differences dt3*a*, dt3*b* . . . are compared with each other and the greatest time difference dt3*max* of these time differences dt3*a*, dt3*b* . . . is determined.

9. The method according to claim 8, wherein the point in time t2 is determined based on a greatest time difference dt3*max*.

10. The method according to claim 1, wherein the pre-set conveying path is a circular path.

11. The method according to claim 1, further comprising providing a plurality of blow moulding stations and associating a specified portion of the conveying path at the pre-set point in time t2 individually with each of the plurality of blow moulding stations.

12. The method according to claim 1, further comprising associating the pre-set point in time t2 with a specified blow moulding station or a specified plastics material pre-form.

13. The method according to claim 1, wherein the pre-set point in time t2 is set such that the blow mould is completely released at a point in time after time t2.

* * * * *